(12) United States Patent
Cha et al.

(10) Patent No.: US 11,463,148 B2
(45) Date of Patent: Oct. 4, 2022

(54) ELECTRONIC DEVICE AND CONTROL METHOD FOR CHANGING ANTENNA SETTING ACCORDING TO BANDWIDTH OF SIGNAL

(71) Applicant: Samsung Electronics Co., Ltd., Suwon-si (KR)

(72) Inventors: Jaemoon Cha, Suwon-si (KR); Seongju Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/274,605

(22) PCT Filed: Sep. 19, 2019

(86) PCT No.: PCT/KR2019/012149
§ 371 (c)(1),
(2) Date: Mar. 9, 2021

(87) PCT Pub. No.: WO2020/060230
PCT Pub. Date: Mar. 26, 2020

(65) Prior Publication Data
US 2022/0052743 A1 Feb. 17, 2022

(30) Foreign Application Priority Data
Sep. 19, 2018 (KR) .................. 10-2018-0112458

(51) Int. Cl.
*H04L 5/12* (2006.01)
*H04B 7/06* (2006.01)
(Continued)

(52) U.S. Cl.
CPC .......... *H04B 7/0695* (2013.01); *H04B 1/401* (2013.01); *H04B 1/405* (2013.01); *H04B 7/0857* (2013.01); *H04B 17/318* (2015.01); *H01Q 1/243* (2013.01)

(58) Field of Classification Search
CPC ...... H04B 7/0695; H04B 1/401; H04B 1/405; H04B 7/0857; H04B 17/318; H04B 1/40;
(Continued)

(56) References Cited

U.S. PATENT DOCUMENTS 8,811,911 B2 * 8/2014 Su ...................... H04B 1/0458
455/193.1
10,187,132 B2 * 1/2019 Kurth .................. H04W 72/042
(Continued)

FOREIGN PATENT DOCUMENTS

JP 2002-232341 A 8/2002
JP 5633559 B2 12/2014
(Continued)

*Primary Examiner* — Helene E Tayong
(74) *Attorney, Agent, or Firm* — Jefferson IP Law, LLP

(57) ABSTRACT

Disclosed is an electronic device and control method for changing an antenna setting according to a bandwidth of a signal. An electronic device according to various embodiments of the present document may comprise at least one antenna, an antenna tuning circuit, and a processor, wherein the processor is configured to: receive signals from a plurality of external devices according to a first antenna setting by using the at least one antenna, respectively; check received power intensities of the received signals, respectively; when the checked received power intensities are equal to or greater than a predesignated threshold intensity, identify a ratio of a signal having a maximum bandwidth from among the signals received from the plurality of external devices; and at least partially on the basis of the
(Continued)

identified ratio, change the first antenna setting to a second antenna setting by using the antenna tuning circuit.

13 Claims, 12 Drawing Sheets

(51) Int. Cl.
*H04B 17/318* (2015.01)
*H04B 1/401* (2015.01)
*H04B 1/405* (2015.01)
*H04B 7/08* (2006.01)
*H01Q 1/24* (2006.01)

(58) Field of Classification Search
CPC ......... H01Q 1/243; H01Q 1/24; H04M 1/725; H04M 1/724; H04M 2201/34
USPC ........................................................ 375/262
See application file for complete search history.

(56) References Cited

U.S. PATENT DOCUMENTS

| | | | |
|---|---|---|---|
| 2004/0009754 A1* | 1/2004 | Smith, Jr. | H04B 1/18 455/121 |
| 2006/0281423 A1* | 12/2006 | Caimi | H01Q 9/045 455/121 |
| 2013/0002487 A1 | 1/2013 | Hosoya et al. | |
| 2013/0154894 A1 | 6/2013 | Caimi et al. | |
| 2013/0265890 A1* | 10/2013 | Ali | H01Q 1/246 370/252 |
| 2015/0282196 A1* | 10/2015 | Kim | H04L 5/006 370/252 |
| 2017/0359113 A1* | 12/2017 | Lee | H04B 17/15 |
| 2018/0069616 A1 | 3/2018 | Kim et al. | |

FOREIGN PATENT DOCUMENTS

| | | |
|---|---|---|
| KR | 10-2015-0112629 A | 10/2015 |
| KR | 10-2018-0028340 A | 3/2018 |
| WO | 2017/202313 A1 | 11/2017 |

* cited by examiner

ELECTRONIC DEVICE AND CONTROL METHOD FOR CHANGING ANTENNA SETTING ACCORDING TO BANDWIDTH OF SIGNAL

CROSS-REFERENCE TO RELATED APPLICATIONS

This application is a National Phase Entry of PCT international Application No. PCT/KR2019/012149, which was filed on Sep. 19, 2019, and claims priority to Korean Patent Application No. 10-2018-0112458 filed on Sep. 19, 2018, in the Korean Intellectual Property Office, the contents of which are incorporated herein by reference.

TECHNICAL FIELD

The disclosure relates to an electronic device and control method for changing the antenna configuration according to signal bandwidths.

BACKGROUND ART

More and more services and additional functions are being provided through electronic devices, e.g., smartphones, or other portable electronic devices. To meet the needs of various users and raise use efficiency of electronic devices, communication service carriers or device manufacturers are jumping into competitions to develop electronic devices with differentiated and diversified functionalities. Accordingly, various functions that are provided through electronic devices are evolving more and more.

DETAILED DESCRIPTION OF THE INVENTION

Technical Problem

An electronic device (e.g., a UE) may transmit and receive signals with a plurality of external devices (e.g., base stations) using a communication circuit (e.g., a modem) and an antenna. As LTE (4G) carrier aggregation (CA) technology advances, and 5G new radio (NR) dual connectivity (DC) and 5G carrier aggregation technology are introduced, such an occasion may arise where the bandwidth of the signal provided by a specific cell is significantly larger than the bandwidth of the signal provided by another cell in the circumstance where there are connections to multiple networks. In this case, if signals are transmitted or received using an antenna configuration capable of enhancing the reception performance for signals having a relatively large bandwidth, signal transmission or reception performance may be enhanced. As such, when an electronic device receives signals from a plurality of cells (or transmits signals to a designated cell), if an antenna configuration is used considering the signal bandwidth, the signal transmission speed or reception speed may be enhanced. In the document, for convenience of description, various processes for changing the transmission/reception properties of an antenna, e.g., an antenna impedance tuning process and/or an antenna aperture tuning process, are simply referred to as an "antenna configuration."

According to various embodiments of the disclosure, there is provided an electronic device capable of enhancing signal transmission/reception speed (e.g., the downlink speed for designated data), which may secure a high modulation rate for signals transmitted/received by transmitting/ receiving signals using an antenna configuration determined based on the signal bandwidth.

According to various embodiments of the disclosure, there is provided an electronic device capable of reducing power consumption by reducing the connection time for a cell by transmitting/receiving signals using an antenna configuration determined based on the signal bandwidth.

According to various embodiments of the disclosure, there is provided a method for controlling an electronic device, capable of enhancing signal transmission/reception speed (e.g., the downlink speed for designated data) by securing a high modulation rate for transmitted/received signals by transmitting/receiving signals using an antenna configuration determined based on the signal bandwidth.

According to various embodiments of the disclosure, there is provided a method for controlling an electronic device, capable of reducing the power consumption of the electronic device by reducing the connection time for a cell by transmitting/receiving signals using an antenna configuration determined based on the signal bandwidth.

Technical Solution

According to various embodiments of the disclosure, there may be provided an electronic device, comprising at least one antenna, an antenna tuning circuit, and a processor configured to receive a signal from each of a plurality of external devices according to a first antenna configuration using the at least one antenna, identify a received power strength for the received signals, identify a ratio of a signal with a maximum bandwidth to the signals received from the plurality of external devices when the identified received power strength is a pre-designated threshold strength or more, and change the first antenna configuration to a second antenna configuration using the antenna tuning circuit at least partially based on the identified ratio.

According to various embodiments of the disclosure, there is provided a method for controlling an electronic device, comprising receiving a signal from each of a plurality of external devices according to a first antenna configuration using at least one antenna included in the electronic device, identifying a received power strength for the received signal, identifying a ratio of a signal with a maximum bandwidth to the signals received from the plurality of external devices when the received power strength is a pre-designated threshold strength or more, and changing the first antenna configuration to a second antenna configuration using an antenna tuning circuit of the electronic device at least partially based on the identified ratio.

According to various embodiments of the disclosure, there is provided an electronic device, comprising at least one antenna, an antenna tuning circuit, and a processor configured to receive a signal from an external device according to a first antenna configuration using the at least one antenna, identify whether a detected transmit power strength is a threshold strength or more when the detected transmit power strength is detected while receiving the signal from the external device according to the first antenna configuration, identify whether the signal is signals received from a plurality of external devices when the detected transmit power strength is the threshold strength or more, identify a received power strength for each of the plurality of signals received from the plurality of external devices when the signal is signals received from the plurality of external devices, identify a ratio of a signal with a maximum bandwidth to the signals received from the plurality of external devices when the identified received power strength is a pre-designated threshold strength or more, and change to a second antenna configuration at least partially based on the identified ratio.

Advantageous Effects

According to various embodiments of the disclosure, it is possible to enhance signal transmission/reception speed (e.g., the downlink speed for designated data) by securing a high modulation rate for signals transmitted/received by transmitting/receiving signals using an antenna configuration determined based on the signal bandwidth.

According to various embodiments of the disclosure, it is possible to reduce power consumption by reducing the connection time for a cell by transmitting/receiving signals using an antenna configuration determined based on the signal bandwidth.

The effects set forth herein are not limited thereto, and it is apparent to one of ordinary skill in the art that various effects may be disclosed herein.

MODE FOR CARRYING OUT THE INVENTION

Figure 1:
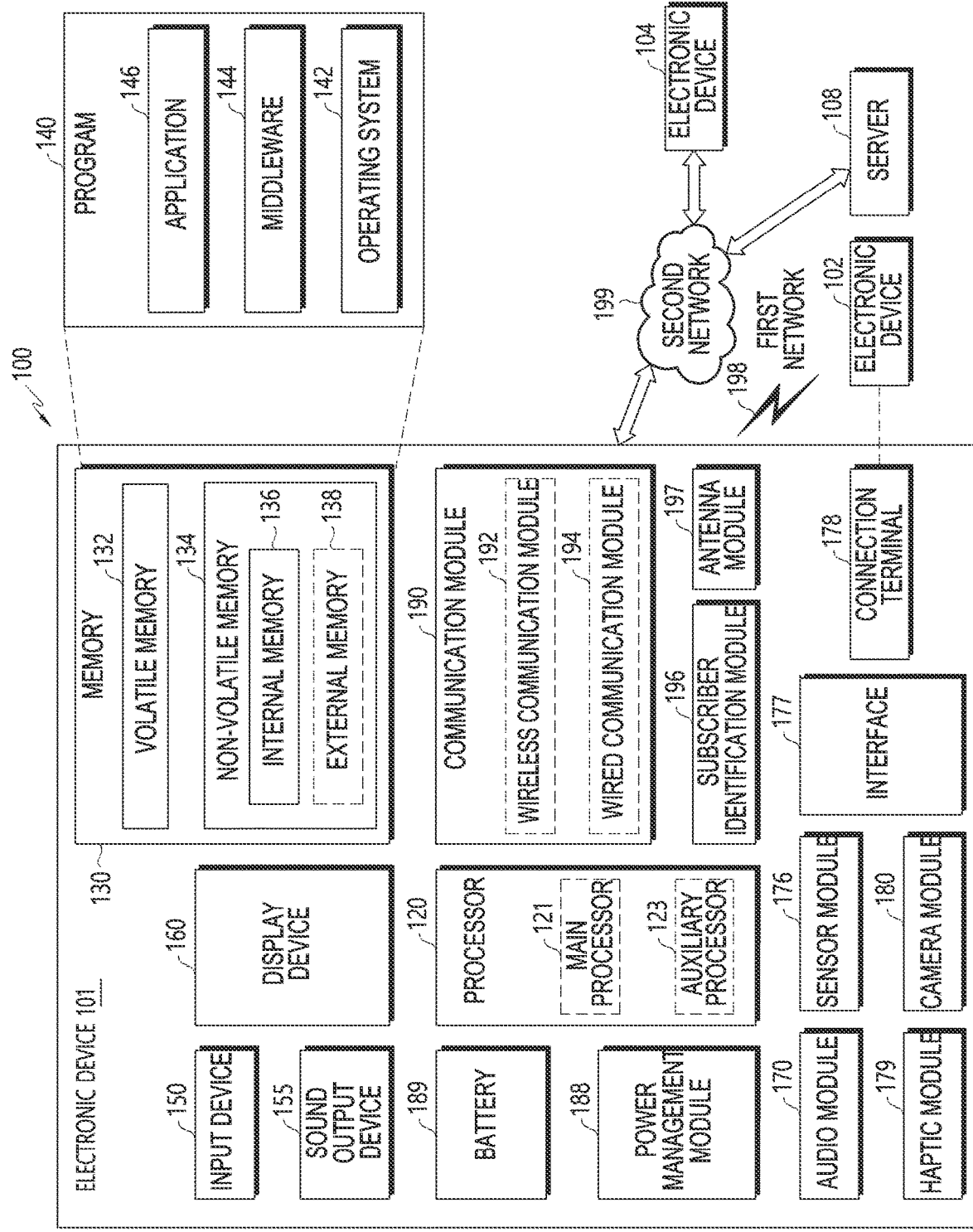
FIG. 1 is a view illustrating an electronic device in a network environment according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a pen input device (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 388 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, instructions or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service.

The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

FIGS. 2A to 2D are views illustrating an electronic device according to various embodiments.

Figure 2A:
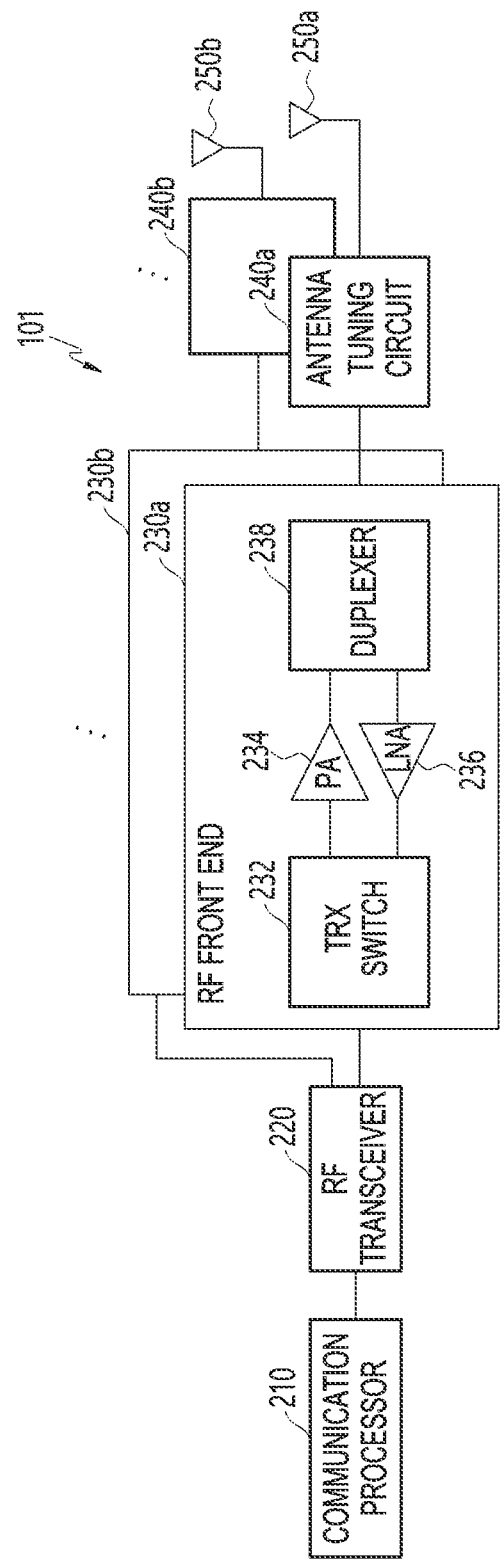
FIGS. 2A to 2D are views illustrating an electronic device according to various embodiments.

Referring to FIG. 2A, an electronic device 100 according to various embodiments of the disclosure may include a communication processor 210, a radio frequency (RF) transceiver 220, a plurality of RF front ends 230a and 230b, a plurality of antenna tuning circuits 240a and 240b, and a plurality of antennas 250a and 250b. FIG. 2A illustrates an embodiment in which the electronic device 101 according to various embodiments of the disclosure includes one communication processor 210, one RF transceiver 220 connected to the communication processor 210, a plurality of RF front ends 230a and 230b connected to the RF transceiver 220, antenna tuning circuits 240a and 240b connected to the plurality of RF front ends 230a and 230b, respectively, and antennas 250a and 250b connected to the antenna tuning circuits 240a and 240b, respectively.

The communication processor 210 according to various embodiments of the disclosure may be connected to be able to operate with at least one of the RF transceiver 220, the RF front end 230, the plurality of antenna tuning circuits 240a and 240b, and the plurality of antennas 250a and 250b. The communication processor 210 according to various embodiments of the disclosure may be connected with various components (e.g., at least one of the RF transceiver 220, the RF front end 230, the plurality of antenna tuning circuits 240a and 240b, and the plurality of antennas 250a and 250b) of the electronic device 101 via a designated interface (e.g., a mobile industry processor interface (MIPI)). The communication processor 210 according to various embodiments of the disclosure may execute software (e.g., the program 140 of FIG. 1) to control at least one other component (e.g., at least one of the RF transceiver 220, the RF front end 230, the plurality of antenna tuning circuits 240a and 240b, and the plurality of antennas 250a and 250b) of the electronic device 101, connected to the communication processor 210. According to various embodiments of the disclosure, the communication processor 210 may be used interchangeably with/instead of an application processor (not shown).

The RF transceiver 210 according to various embodiments of the disclosure may be operatively connected to the communication processor 210 and the RF front end 230. The RF transceiver 210 according to various embodiments of the disclosure may modulate (e.g., frequency modulate) an RF signal to be transmitted to an external device (e.g., a base station). The RF transceiver 210 according to various embodiments of the disclosure may modulate (e.g., frequency modulate) the RF signal received from the external device (e.g., a base station).

The front end 210 according to various embodiments of the disclosure may include at least one of a transmission/reception (TRX) switch 232, a power amplifier (PA) 234, a low noise amplifier (LNA) 236, and a duplexer 238.

According to various embodiments of the disclosure, the signal (e.g., an RF signal) received from the external device (e.g., a base station) may be transmitted to the RF transceiver 220 through the transmission/reception switch 232.

According to various embodiments of the disclosure, the signal (e.g., an RF signal) output from the RF transceiver 220 may be transmitted to the power amplifier 234 through the transmission/reception switch 232.

The power amplifier 234 according to various embodiments of the disclosure may amplify the RF signal output from the RF transceiver 220. The power amplifier 234 according to various embodiments of the disclosure may include a power level detection circuit, such as a transmitter signal strength indicator (TSSI).

The low-noise amplifier 236 according to various embodiments of the disclosure may amplify the RF signal received from the external device.

The duplexer 238 according to various embodiments of the disclosure may separate the transmission and reception frequencies of the electronic device 101. For example, the duplexer 238 may be used to implement a frequency division duplex (FDD) system. The electronic device according to various embodiments of the disclosure may include a plurality of antennas (e.g., 250a and 250b).

Figure 2B:
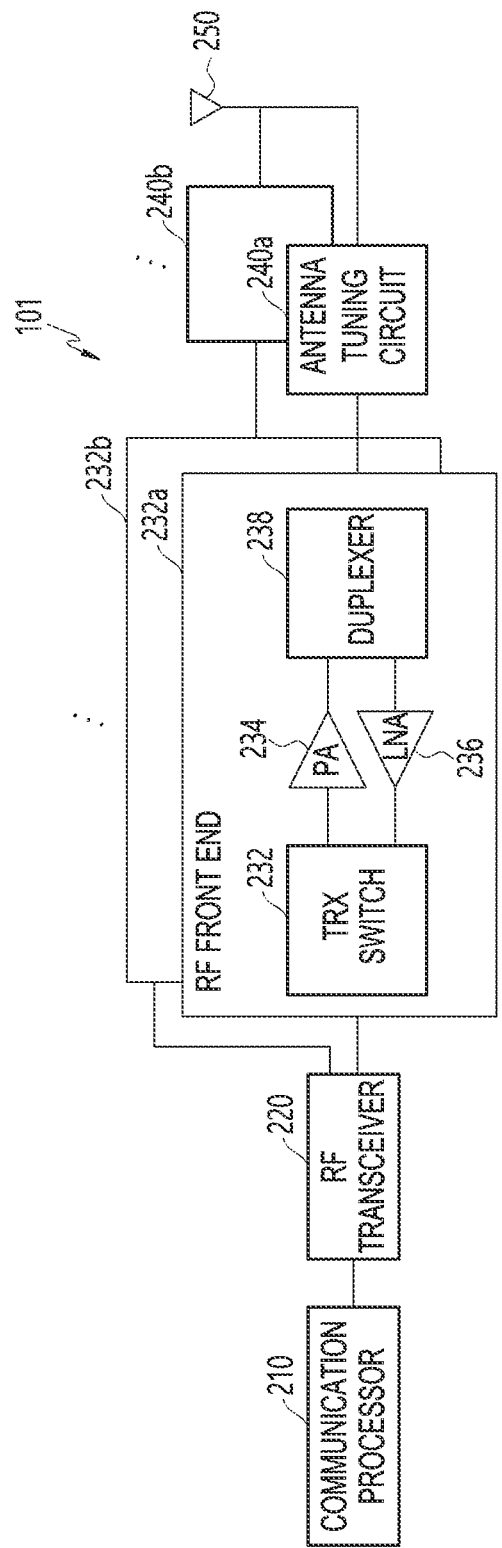

FIG. 2B illustrates an embodiment in which the electronic device 101 according to various embodiments of the disclosure includes one communication processor 210, one RF transceiver 220 connected to the communication processor 210, a plurality of RF front ends 230a and 230b connected to the RF transceiver 220, antenna tuning circuits 240a and 240b connected to the plurality of RF front ends 230a and 230b, respectively, and one antenna 250 connected to the antenna tuning circuits 240a and 240b.

Figure 2C:
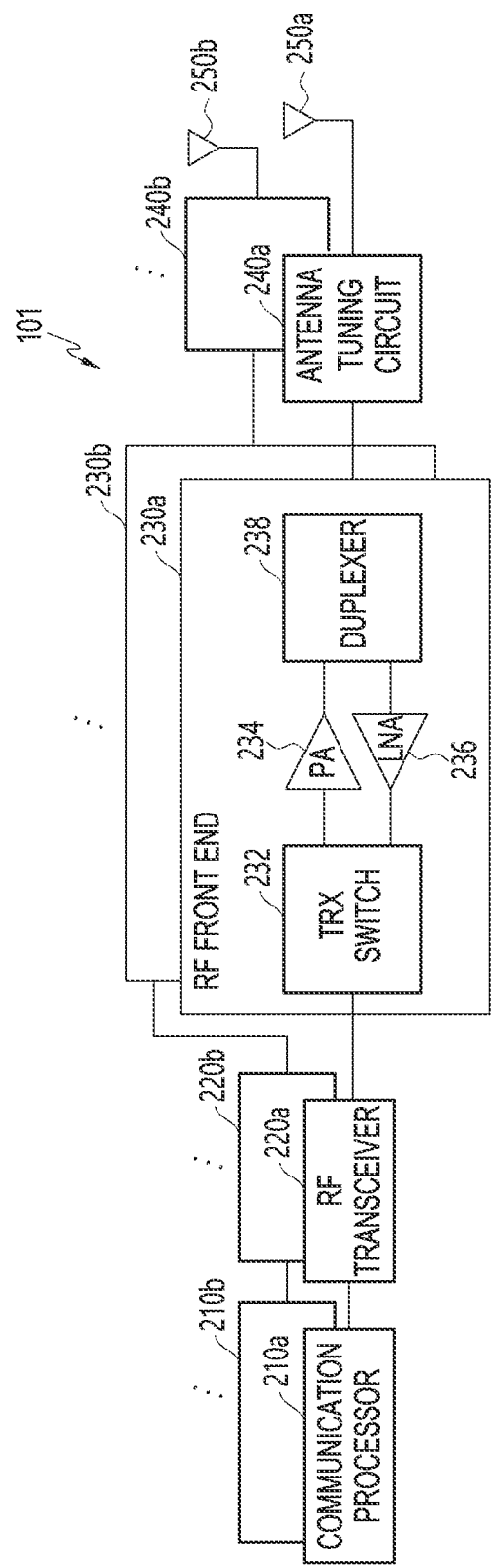

FIG. 2C illustrates an embodiment in which the electronic device 101 according to various embodiments of the disclosure includes a plurality of communication processors 210a and 210b, a plurality of RF transceivers connected to the plurality of communication processors 210a and 210b, respectively, RF front ends 230a and 230b connected to the plurality of RF transceivers 220a and 220b, respectively, one antenna tuning circuit 240 connected to each of the RF front ends 230a and 230b, and one antenna 250 connected to the antenna tuning circuit 240.

Figure 2D:
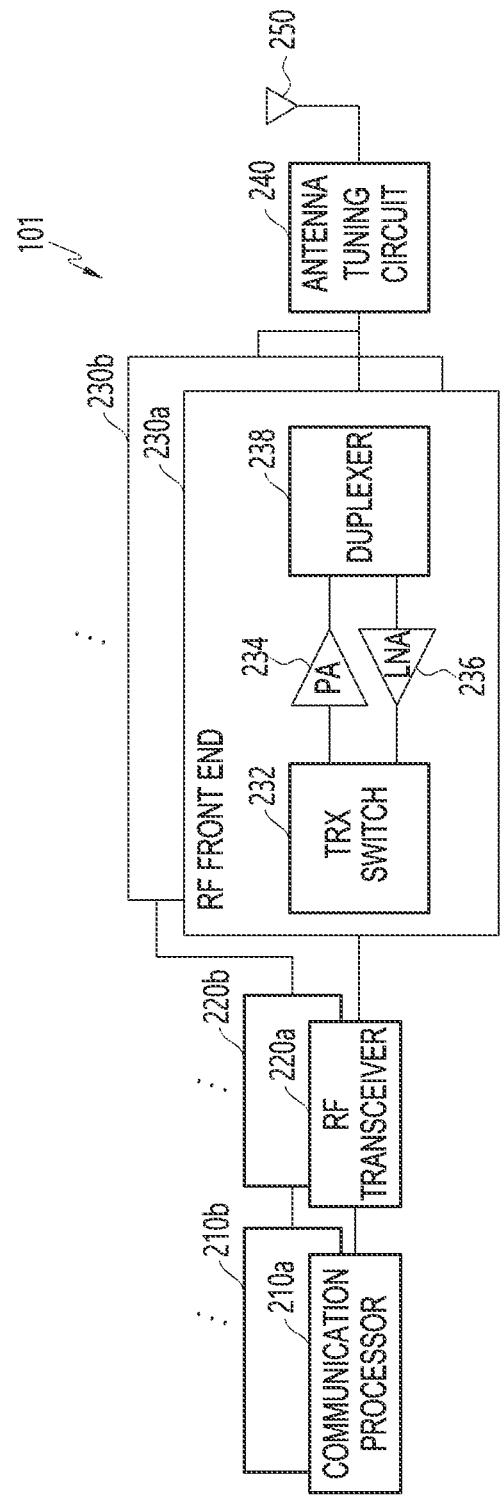

FIG. 2D illustrates an embodiment in which the electronic device 101 according to various embodiments of the disclosure includes a plurality of communication processors 210a and 210b, RF transceivers 220a and 220b connected to the plurality of communication processors 210a and 210b, respectively, RF front ends 230a and 230b connected to the RF transceivers 220a and 220b, respectively, antenna tuning circuits 240a and 240b connected to the RF front ends 230a and 230b, respectively, and antennas 250a and 250b connected to the antenna tuning circuits 240a and 240b, respectively.

Figure 3A:
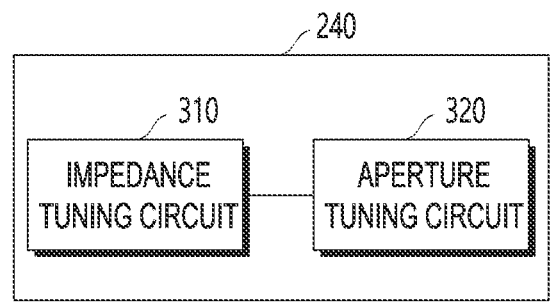
FIGS. 3A to 3C are views illustrating an antenna tuning circuit according to various embodiments.
Figure 3B:
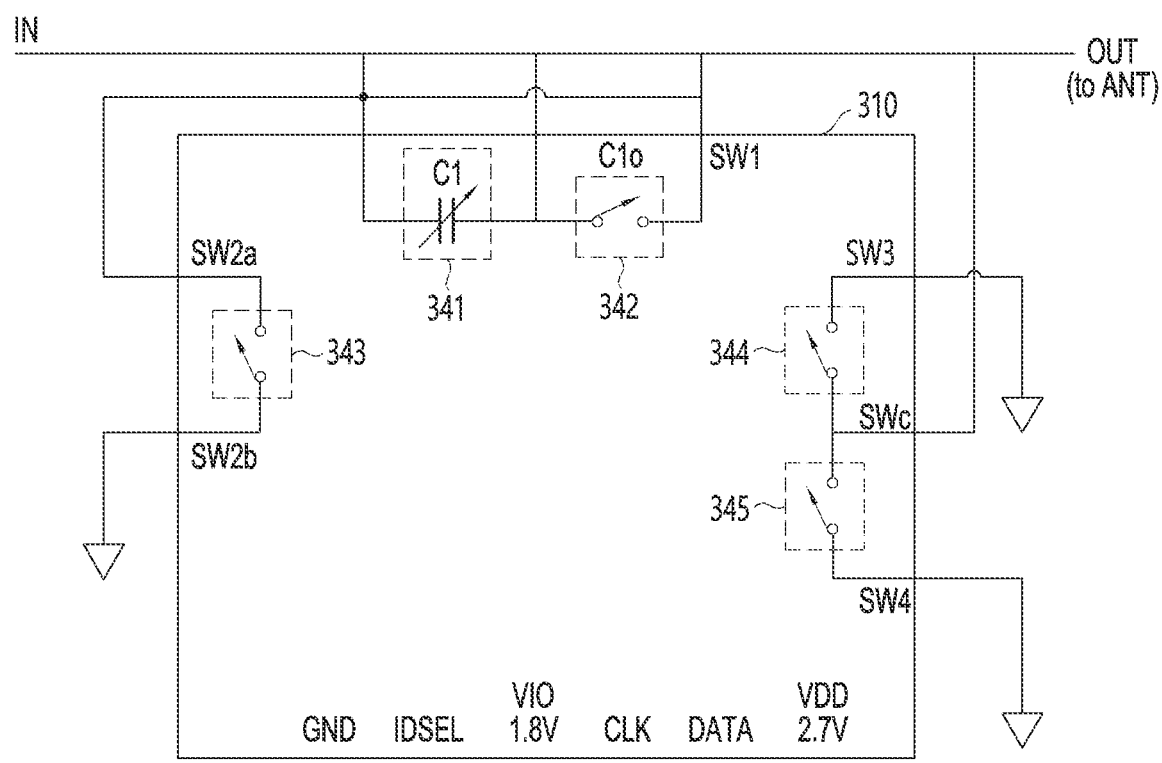
Figure 3C:
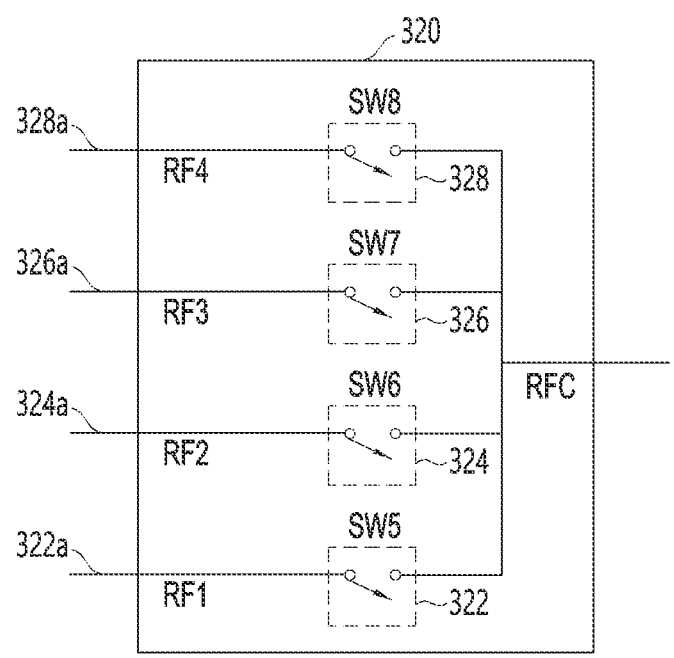

FIGS. 3A to 3C are views illustrating an antenna tuning circuit 240 according to various embodiments.

Referring to FIG. 3A, the antenna tuning circuit 240 according to various embodiments of the disclosure may include at least one impedance tuning circuit 310 and at least one aperture tuning circuit 320. The impedance tuning circuit 310 according to various embodiments of the disclosure may be configured to perform impedance matching with a network under the control of the communication processor 210. The aperture tuning circuit 320 according to various embodiments of the disclosure may turn on/off a switch under the control of the communication processor 210, changing the structure of the antenna (e.g., the antenna 250 of FIG. 2C). FIG. 3B illustrates an exemplary circuit diagram for describing the impedance tuning circuit 310. FIG. 3C illustrates an exemplary circuit diagram for describing the aperture tuning circuit 320.

Referring to FIG. 3B, the impedance tuning circuit 310 according to various embodiments of the disclosure may include at least one variable capacitor 341, a first switch 342, a second switch 343, a third switch 344, and a fourth switch 345. According to various embodiments of the disclosure, the number of the variable capacitor 341, the first switch 342, the second switch 343, the third switch 344, and the fourth switch 345 may be changed. At least one variable capacitor 341, the first switch 342, the second switch 343, the third switch 344, and the fourth switch 345 according to various embodiments of the disclosure are implemented on one chip. The variable capacitor 341 according to various embodiments of the disclosure may have, e.g., 16 values (e.g., capacitance values). In this case, the impedance tuning circuit 310 according to various embodiments of the disclosure has a total of 256 settable values (e.g., impedance values) (16 (the number of values that the variable capacitor may have)×16 (the number of cases that may be obtained by combinations of four switches). The variable capacitor 341 according to various embodiments of the disclosure may be electrically connected to the first switch 342. One end of each of the second switch 343, the third switch 344, and the fourth switch 345 according to various embodiments of the disclosure may be grounded.

Referring to FIG. 3C, the aperture tuning circuit 320 according to various embodiments of the disclosure may include a fifth switch 322, a sixth switch 324, a seventh switch 326, and an eighth switch 328. According to various embodiments of the disclosure, the fifth switch 322 may be connected to a first terminal (RF1) 322a. According to various embodiments of the disclosure, the sixth switch 324 may be connected to a second terminal (RF2) 324a. According to various embodiments of the disclosure, the seventh switch 326 may be connected to a third terminal (RF3) 326a. According to various embodiments of the disclosure, the eighth switch 328 may be connected to a fourth terminal (RF4) 328a. According to various embodiments of the disclosure, the number of the switches included in the aperture tuning circuit 320 may be changed. According to various embodiments of the disclosure, the fifth switch 322, the sixth switch 324, the seventh switch 326, and the eighth switch 328 may be implemented on a single chip. According to various embodiments of the disclosure, the aperture tuning circuit 320 may have a total of 16 possible cases by on/off combinations of the switches (e.g., the fifth switch 322, the sixth switch 324, the seventh switch 326, and the eighth switch 328). Accordingly, the tuning circuit 250 according to various embodiments of the disclosure may have a total of 4096 antenna configurations (i.e., 256×16).

The antenna configurations according to various embodiments of the disclosure may be previously (e.g., when the electronic device 101 is manufactured) measured and stored in the form of a mapping table in a memory (e.g., the memory 130 of FIG. 1). According to various embodiments of the disclosure, the mapping table may include bandwidth information, the 4096 antenna configurations mentioned herein as an example, and voltage standing-wave ratios corresponding to the bandwidths and antenna configurations. The bandwidth information included in the mapping table according to various embodiments of the disclosure may include information on all bandwidths that may be provided by the network operator.

Figure 4:
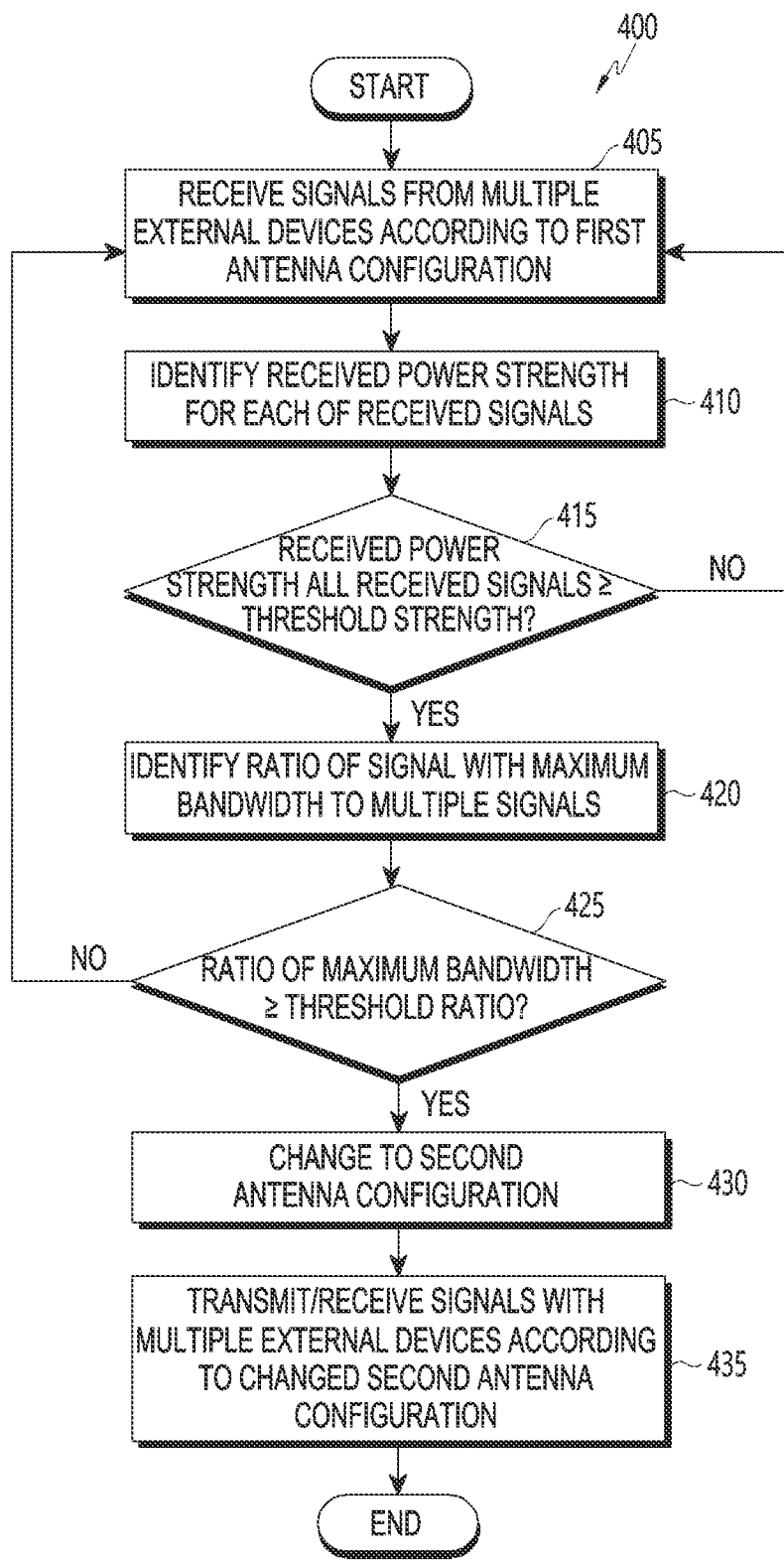
FIG. 4 is a view illustrating an example method of operating an electronic device according to various embodiments.

FIG. 4 is a view illustrating an example method 400 of operating an electronic device according to various embodiments.

Referring to FIG. 4, a method 400 for operating an electronic device according to various embodiments of the disclosure may include an operation in which the electronic device (e.g., the communication processor 210 of FIG. 2A) receives signals from a plurality of external devices (e.g., base stations) using at least one antenna, according to a first antenna configuration, in operation 405. The first antenna configuration according to various embodiments of the disclosure may include a pre-designated antenna configuration. According to various embodiments of the disclosure, the pre-designated antenna configuration may include any one antenna configuration in which the loss of each of the plurality of received signals may be minimized in the state in which only receive power is detected (e.g., an idle state). According to various embodiments of the disclosure, the pre-designated antenna configuration may include an antenna configuration determined so that the power loss of any one of the plurality of received signals is smaller than the power loss of another signal/other signals. According to various embodiments of the disclosure, the electronic device (e.g., the communication processor 210 of FIG. 2A) may transmit a signal (e.g., a MIPI signal) indicating the pre-designated antenna configuration to an antenna tuning circuit (e.g., the antenna tuning circuit 240 of FIG. 2C). The antenna tuning circuit (e.g., the antenna tuning circuit 240 of FIG. 2C) according to various embodiments of the disclosure may set an antenna according to the signal transmitted from the communication processor (the communication processor 210 of FIG. 2A).

According to various embodiments of the disclosure, the method 400 for operating an electronic device may include an operation in which the electronic device (e.g., the communication processor 210 of FIG. 2A) identifies the received power strength for each of the received signals in operation 410. According to various embodiments of the disclosure, the received power strength may be identified by the reference signal received power (RSRP) or signal-to-noise ratio (SNR).

According to various embodiments of the disclosure, the method 400 for operating an electronic device may include an operation in which the electronic device (e.g., the communication processor 210 of FIG. 2A) identifies whether the received power strength for all the received signals is a pre-designated threshold strength or more in operation 415.

According to various embodiments of the disclosure, the method 400 for operating an electronic device may include an operation in which the electronic device (e.g., the communication processor 210 of FIG. 2A) identifies a ratio of signals with the maximum bandwidth to the plurality of signals when the received power strength for all the received signals is the threshold strength or more (yes in operation 415), in operation 420. For example, according to various embodiments of the disclosure, the electronic device (e.g., the communication processor 210 of FIG. 2A) may identify the ratio of signals with the maximum bandwidth (for convenience, simply referred to herein as a "ratio of signals with the maximum bandwidth") of the sum of the bandwidths, except for the signals with the maximum bandwidth, of the sum of the bandwidths of the plurality of received signals. According to various embodiments of the disclosure, the bandwidth information may be received from an external device (e.g., a base station). According to various embodiments of the disclosure, the ratio of signals with the maximum bandwidth may be identified using Equation 1 below.

Bandwidth of signal with maximum bandwidth/(sum of bandwidths for multiple signals−bandwidth of signal with maximum bandwidth)    Equation 1

According to various embodiments of the disclosure, the method 400 for operating an electronic device may include an operation in which the electronic device (e.g., the communication processor 210 of FIG. 2A) maintains the current antenna configuration upon identifying that the received power strength for any one received signal is not more than the threshold strength (no in operation 415) in operation 415.

According to various embodiments of the disclosure, the method 400 for operating an electronic device may include an operation in which the electronic device (e.g., the communication processor 210 of FIG. 2A) identifies whether the ratio of the maximum bandwidth is a threshold ratio or more in operation 425.

According to various embodiments of the disclosure, the method 400 for operating an electronic device may include an operation in which the electronic device (e.g., the communication processor 210 of FIG. 2A) changes the antenna configuration to a second antenna configuration upon identifying that the ratio of the maximum bandwidth is the threshold ratio or more (yes in operation 425), in operation 430. According to various embodiments of the disclosure, the second antenna configuration may include an antenna configuration in which the degree of loss may be lower than the loss of the maximum bandwidth according to the first antenna configuration (e.g., the degree of loss from 2 dB to 1 dB). According to various embodiments of the disclosure, the second antenna configuration may be previously determined according to the signal bandwidth. According to various embodiments of the disclosure, the communication processor (e.g., the communication processor 210 of FIG. 2A) may identify the magnitude of the maximum bandwidth among the plurality of received signals and identify the antenna configuration corresponding to the magnitude of the maximum bandwidth by referring to the mapping table. According to various embodiments of the disclosure, the communication processor (e.g., the communication processor 210 of FIG. 2A) may transmit a signal (e.g., a MIPI signal) for the identified antenna configuration to at least one antenna tuning circuit (e.g., the antenna tuning circuit 240 of FIG. 2C). According to various embodiments of the disclosure, when there are a plurality of antenna tuning circuits, the communication processor may transmit the same signal to each antenna tuning circuit. According to various embodiments of the disclosure, the first antenna configuration may include an antenna configuration in which the first switch 342 of the impedance tuning circuit (e.g., the impedance tuning circuit 310 of FIG. 3B) is shorted while the other remaining switches are open, and the seventh switch 326 of the aperture tuning circuit (e.g., the aperture tuning circuit 320 of FIG. 3C) is shorted while the other remaining switches are open. According to various embodiments of the disclosure, by the first antenna configuration, a signal with a relatively low bandwidth (e.g., 10 Mhz) may cause a power loss of 1 dB relative to the maximum performance, and a signal with the maximum bandwidth (e.g., 20 Mhz) among the received signals may cause a power loss of 2 dB relative to the maximum antenna of the antenna. According to various embodiments of the disclosure, the second antenna configuration may include an antenna configuration in which the second switch 343 of the impedance tuning circuit (e.g., the impedance tuning circuit 310 of FIG. 3B) is shorted while the other remaining switches are open, and the fifth switch 322 of the aperture tuning circuit (e.g., the aperture tuning circuit 320 of FIG. 3C) is shorted while the other remaining switches are open. According to various embodiments of the disclosure, by the second antenna configuration, a signal with a relatively low bandwidth (e.g., 10 Mhz) may cause a power loss of 3 dB relative to the maximum performance of the antenna, and a signal with the maximum bandwidth (e.g., 20 Mhz) among the received signals may cause a power loss of 0.1 dB relative to the maximum antenna of the antenna. According to various embodiments of the disclosure, the second antenna configuration may include an antenna configuration in which the power loss of the signal with the maximum bandwidth is lowest, as well as an antenna configuration in which the power loss of the maximum bandwidth is reduced as compared with the first antenna configuration.

According to various embodiments of the disclosure, the method 400 for operating an electronic device may include an operation in which the electronic device (e.g., the communication processor 210 of FIG. 2A) transmits/receives signals (e.g., data) with a plurality of external devices according to the changed second antenna configuration in operation 435.

According to various embodiments of the disclosure, the method may further include the operation of identifying whether the electronic device (e.g., the electronic device 101 of FIG. 1) is in the state of receiving signals from the plurality of external devices before operation 405.

Figure 5A:
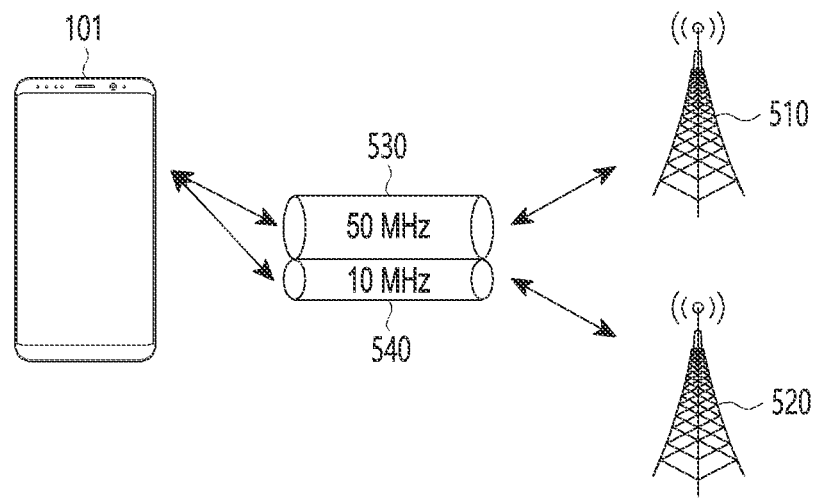
FIGS. 5A and 5B are views illustrating a function or operation of receiving a plurality of signals from a plurality of external devices according to various embodiments.
Figure 5B:
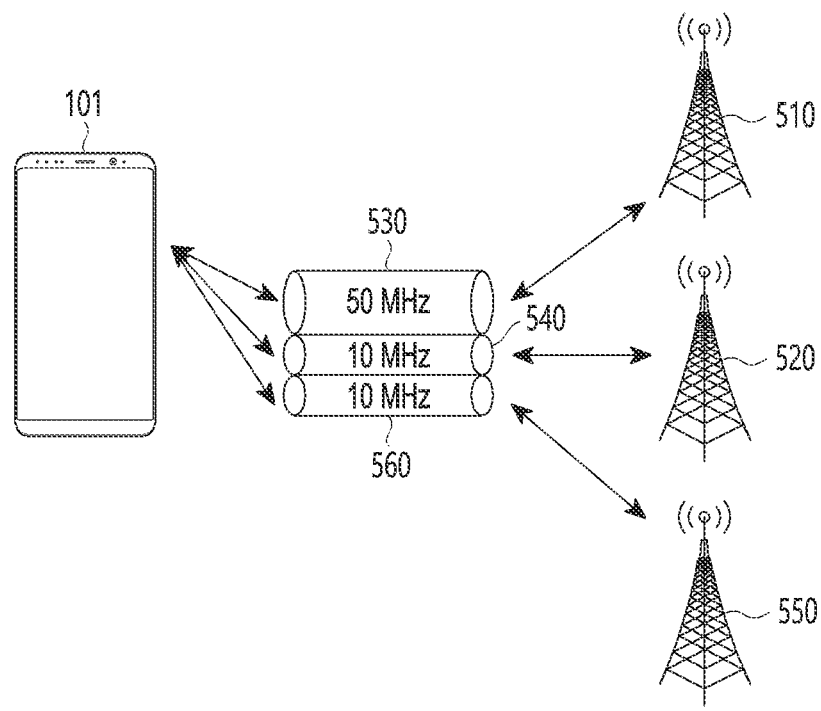

FIGS. 5A and 5B are views illustrating a function or operation of receiving a plurality of signals from a plurality of external devices according to various embodiments.

Referring to FIG. 5A, the electronic device 101 according to various embodiments of the disclosure may receive a plurality of signals (a first signal 530 and a second signal 540) from a plurality of base stations 510 and 520. According to various embodiments of the disclosure, the first signal 530 (e.g., 50 MHz) may be a signal having a relatively larger bandwidth than the second signal 540 (e.g., 10 MHz).

Referring to FIG. 5B, the electronic device 101 according to various embodiments of the disclosure may receive a plurality of signals (e.g., a first signal 530, a second signal 540, and a third signal 560) from a plurality of base stations 510, 520, and 550. According to various embodiments of the disclosure, among the plurality of signals (e.g., the first signal 530, the second signal 540, and the third signal 560), the first signal 530 may be a signal having the maximum bandwidth (e.g., 50 MHz).

Various embodiments of the disclosure may be used in various communication environments in which data is transmitted/received based on a plurality of signals, such as, e.g., 4G LTE carrier aggregation (CA), 5G new radio dual connectivity (NR DC), or CA in the 5G environment.

According to various embodiments of the disclosure, the electronic device 101 may receive all of the plurality of signals (e.g., the first signal 530 and the second signal 540) through one antenna or each of the plurality of antennas may receive a respective one of the plurality of signals (e.g., the first signal 530 and the second signal 540).

Figure 6:
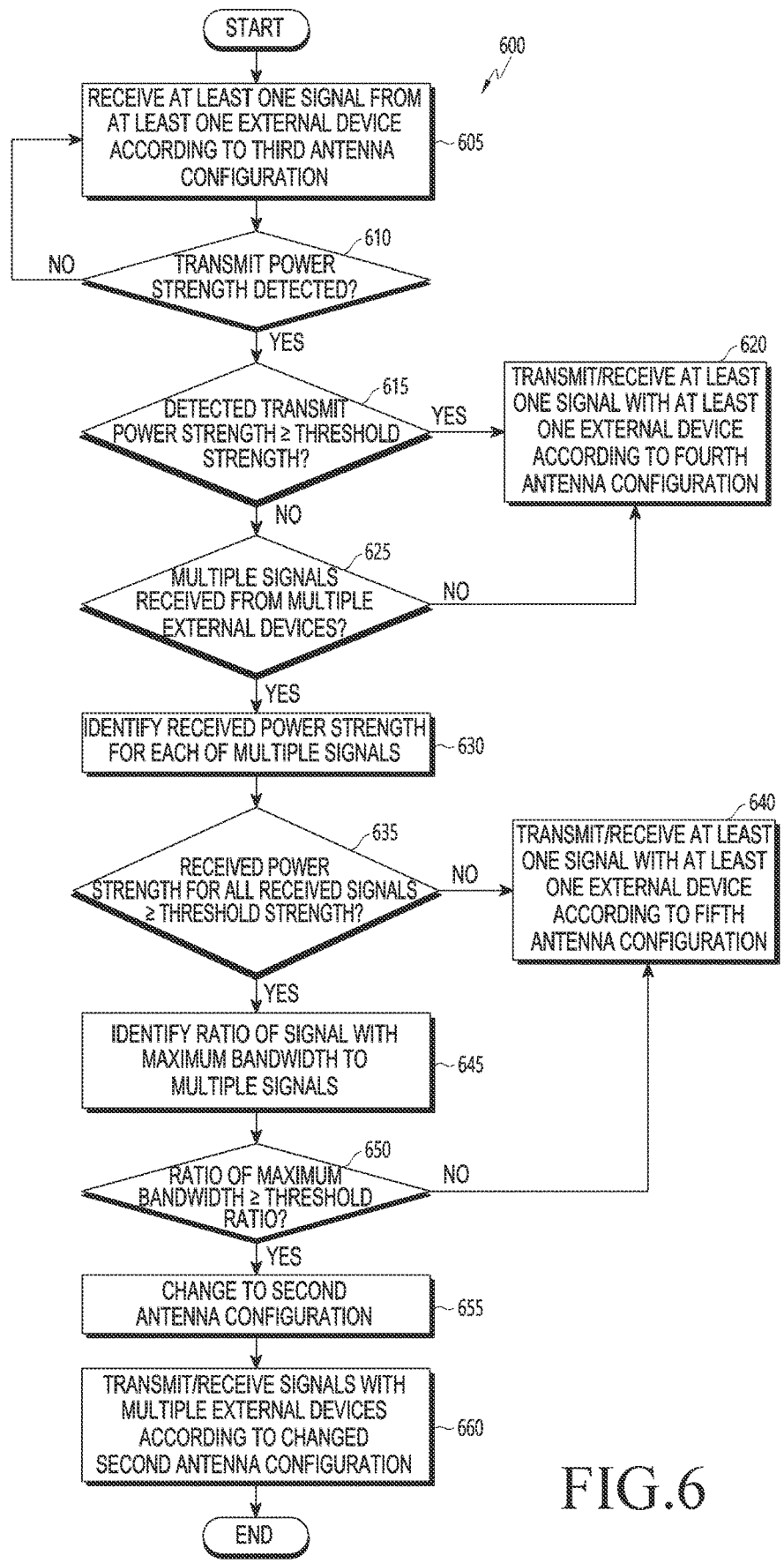
FIGS. 6 to 8 are views illustrating an example method of operating an electronic device according to various embodiments.
Figure 7:
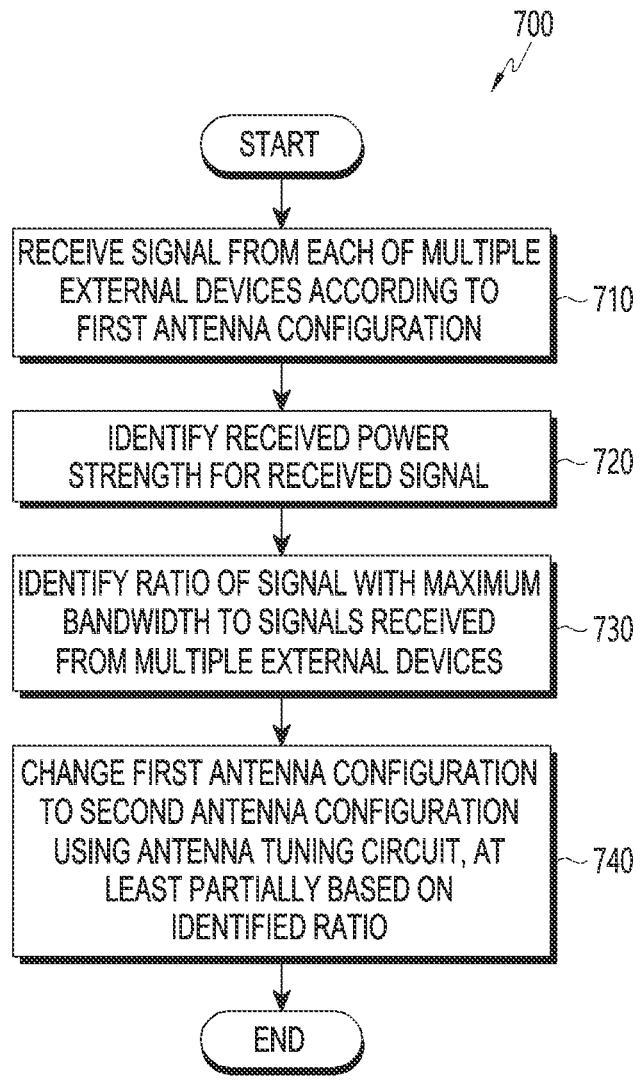
Figure 8:
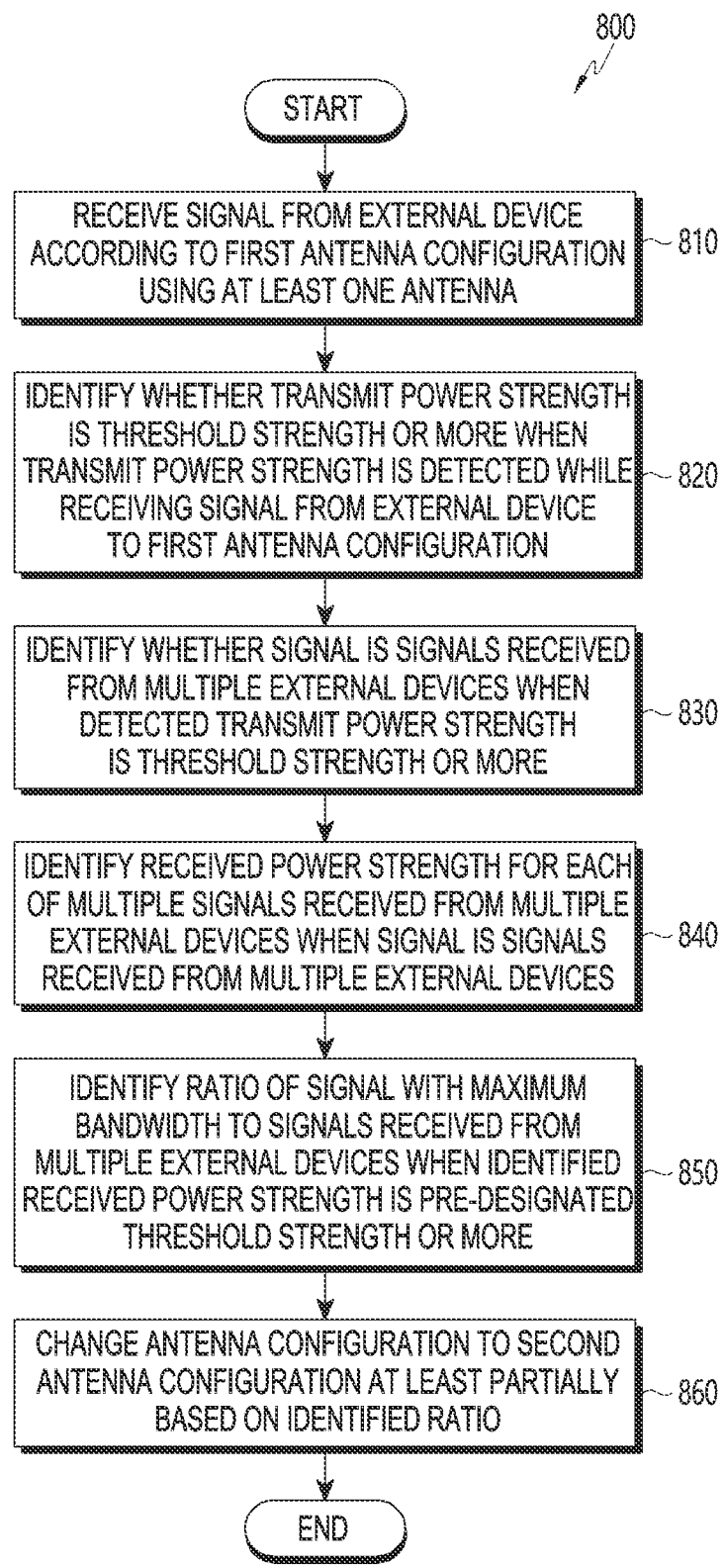

FIGS. 6 to 8 are views illustrating an example method of operating an electronic device 101 according to various embodiments.

Referring to FIG. 6, a method 600 for operating an electronic device 101 according to various embodiments of the disclosure may include an operation in which the electronic device (e.g., the communication processor 210 of FIG. 2A) receives at least one signal from at least one external device according to a third antenna configuration, in operation 605. In operation 605 according to various embodiments of the disclosure, the electronic device may be in an idle state. In other words, in operation 605 according to various embodiments of the disclosure, only the receive power for the received signal may be detected.

According to various embodiments of the disclosure, the method 600 for operating an electronic device 101 may include an operation in which the electronic device (e.g., the communication processor 210 of FIG. 2A) identifies whether a transmit power strength is detected (e.g., a call transmission) in operation 610.

According to various embodiments of the disclosure, the method 600 for operating an electronic device 101 may include an operation in which the electronic device (e.g., the communication processor 210 of FIG. 2A) identifies whether the detected transmit power strength is a threshold strength or more in operation 615 upon identifying that the transmit power strength is detected (yes in operation 610). According to various embodiments of the disclosure, when no transmit power strength is detected (no in operation 610), the state in which at least one signal is received from at least one external device according to the third antenna configuration may be maintained.

According to various embodiments of the disclosure, the method 600 for operating an electronic device 101 may include an operation in which the electronic device (e.g., the communication processor 210 of FIG. 2A) identifies whether at least one signal is received from a plurality of external devices in operation 625 when the transmit power strength is less than the threshold strength (no in operation 615).

According to various embodiments of the disclosure, the method 600 for operating an electronic device 101 may include an operation in which the electronic device (e.g., the communication processor 210 of FIG. 2A) transmits/receives at least one signal with at least one external device according to a fourth antenna configuration in operation 620 when the transmit power strength is the threshold strength or more (yes in operation 615). According to various embodiments of the disclosure, the fourth antenna configuration may include an antenna configuration in which the power loss of the receive signal and transmit signal may be minimized within a permissible range. For example, it is impossible to apply the antenna configuration in which power loss may be minimized for both the transmit signal and the receive signal because the transmission frequency and the reception frequency differ in the frequency division scheme. Thus, according to various embodiments of the disclosure, the communication processor (e.g., the communication processor 210 of FIG. 2A) may determine the antenna configuration in which power loss that falls within a designated range (or permissible power loss) occurs based on the mapping table and the status of the antenna. According to various embodiments of the disclosure, the fourth antenna configuration may include an antenna configuration determined so that the power loss (e.g., 0.1 dB) of the receive signal is smaller than the power loss (e.g., 0.4 dB) of the transmit signal. According to various embodiments of the disclosure, the fourth antenna configuration may include an antenna configuration corresponding to the status of the antenna identified every designated time (e.g., 200 ms). According to various embodiments of the disclosure, the status of antenna may be identified by measuring the VSWR for the transmit signal by, e.g., the communication processor (e.g., the communication processor 210 of FIG. 2A). According to various embodiments of the disclosure, the communication processor (e.g., the communication processor 210 of FIG. 2A) may identify the antenna configuration corresponding to the identified VSWR, determining the fourth antenna configuration.

According to various embodiments of the disclosure, the method 600 for operating an electronic device 101 may include an operation in which the electronic device (e.g., the communication processor 210 of FIG. 2A) identifies whether at least one signal is signals received from a plurality of external devices in operation 625 when the transmit power strength is less than the threshold strength (no in operation 615).

According to various embodiments of the disclosure, the method 600 for operating an electronic device 101 may include an operation in which the electronic device (e.g., the communication processor 210 of FIG. 2A) identifies the received power strength for each of the plurality of signals in operation 630 when the at least one signal is signals received from the plurality of external devices (yes in operation 625). According to various embodiments of the disclosure, the method 600 for operating an electronic device 101 may include an operation in which the electronic device (e.g., the communication processor 210 of FIG. 2A) transmits/receives signals according to the fourth antenna configuration in operation 620 when the at least one signal is signals received from one external device (no in operation 625). At least some of the first antenna configuration and the third antenna configuration to the fifth antenna configuration mentioned in the disclosure may include the same antenna configuration.

According to various embodiments of the disclosure, the method 600 for operating an electronic device may include an operation in which the electronic device (e.g., the communication processor 210 of FIG. 2A) identifies whether the received power strength for all the received signals is a pre-designated threshold strength or more in operation 635.

According to various embodiments of the disclosure, the method 600 for operating an electronic device may include an operation in which the electronic device (e.g., the communication processor 210 of FIG. 2A) identifies a ratio of signals with the maximum bandwidth when the received power strength for all the received signals is the threshold strength or more (yes in operation 635), in operation 645. According to various embodiments of the disclosure, the method 600 for operating an electronic device may include the operation of transmitting/receiving a signal according to a fifth antenna configuration in operation 640 when the received power strength for all the received signals is less than the threshold strength (no in operation 635). According to various embodiments of the disclosure, the fifth antenna configuration may include an antenna configuration pre-designated according to the VSWR. According to various embodiments of the disclosure, the communication processor (e.g., the communication processor 210 of FIG. 2A) may identify the VSWR value for the transmit signal and identify the antenna configuration corresponding to the VSWR based on the mapping table.

According to various embodiments of the disclosure, the method 600 for operating an electronic device may include an operation in which the electronic device (e.g., the communication processor 210 of FIG. 2A) identifies whether the ratio of the maximum bandwidth is a threshold ratio or more in operation 650.

According to various embodiments of the disclosure, the method 600 for operating an electronic device may include an operation in which the electronic device (e.g., the communication processor 210 of FIG. 2A) changes the antenna configuration to a second antenna configuration upon identifying that the ratio of the maximum bandwidth is the threshold ratio or more (yes in operation 650), in operation 655. According to various embodiments of the disclosure, the method 600 for operating an electronic device may include the operation of transmitting/receiving a signal according to the fifth antenna configuration upon identifying that the ratio of maximum bandwidth is less than a threshold ratio (no in operation 650). According to various embodiments of the disclosure, the electronic device (e.g., the communication processor 210 of FIG. 2A) may determine the second antenna configuration by referring to the mapping table as shown in Table 1 below. According to various embodiments of the disclosure, the electronic device (e.g., the communication processor 210 of FIG. 2A) may determine that the antenna configuration in which the loss corresponding to the maximum bandwidth is smaller than the loss corresponding to the maximum bandwidth according to other antenna configurations (e.g., at least one of the first antenna configuration, the third antenna configuration to the fifth antenna configuration) is the second antenna configuration, by referring to the mapping table as shown in Table 1 below. For example, according to various embodiments of the disclosure, by the fifth antenna configuration, a configuration for the aperture tuning circuit (e.g., the aperture tuning circuit 320 of FIG. 3A) may be set to "0x2", and a configuration for the impedance tuning circuit (e.g., the impedance tuning circuit 310 of FIG. 3A) may be set according to the "0x1" value. According to various embodiments of the disclosure, it may be changed to an antenna configuration for the case where the loss for the maximum bandwidth (e.g., a bandwidth of 3500 Mhz) is reduced (e.g., change of the antenna configuration of the impedance tuning circuit to the antenna configuration corresponding to the "0x3" value from the "0x1" value). In Table 1 below, "0x2" may mean a value representing the control state (e.g., on/off state) of a switch included in the aperture tuning circuit (e.g., the aperture tuning circuit 320 of FIG. 3A). For example, "0x2" may represent a case in which the state of the switches of all ports included in the aperture tuning circuit (e.g., the aperture tuning circuit 320 of FIG. 3A) are turned on. According to various embodiments of the disclosure, "0x1" to "0x7" of the impedance tuning circuit (e.g., the impedance tuning circuit 310 of FIG. 3A) may represent the variable capacitance value of the impedance tuning circuit (e.g., the impedance tuning circuit 310 of FIG. 3A) and the control state (e.g., on/off state) of the switch. For example, "0x3" may represent the case where the value of the variable capacitor (C1) 341 has a pre-designated value, and the first switch (e.g., the first switch 342 of FIG. 3B) and the second switch (e.g., the second switch 343 of FIG. 3B) are set to the on state, and the third switch (e.g., the third switch 344 of FIG. 3B) and the fourth switch (e.g., the fourth switch 345 of FIG. 3B) are set to the off state. According to various embodiments of the disclosure, the states of the switches and the variable capacitor for each value may be previously designated. In Table 1 below, the loss according to the bandwidth and the antenna configuration is described in dBm as an example.

TABLE 1

| | Unit: dBm | | | | | | |
|---|---|---|---|---|---|---|---|
| | Aperture tuning circuit 0x2 | | | | | | |
| | Impedance tuning circuit | | | | | | |
| | 0x1 | 0x2 | 0x3 | 0x4 | 0x5 | 0x6 | 0x7 |
| Bandwidth 700 MHz | 10 | 13 | 14 | 17 | 19 | 9 | 10 |
| Bandwidth 800 MHz | 11 | 14 | 15 | 18 | 20 | 10 | 11 |
| Bandwidth 900 MHz | 5 | 8 | 9 | 12 | 14 | 7 | 8 |
| Bandwidth 1700 MHz | 7 | 10 | 11 | 14 | 16 | 6 | 7 |
| Bandwidth 1800 MHz | 5 | 6 | 7 | 10 | 12 | 5 | 6 |
| Bandwidth 1900 MHz | 4 | 7 | 8 | 11 | 13 | 4 | 5 |
| Bandwidth 2100 MHz | 5 | 8 | 9 | 12 | 14 | 3 | 4 |
| Bandwidth 2500 MHz | 10 | 13 | 14 | 17 | 19 | 5 | 6 |
| Bandwidth 2600 MHz | 12 | 15 | 16 | 19 | 21 | 15 | 16 |
| Bandwidth 3500 MHz | 6 | 11 | 5 | 15 | 17 | 17 | 18 |

According to various embodiments of the disclosure, the method 600 for operating an electronic device may include an operation in which the electronic device (e.g., the communication processor 210 of FIG. 2A) transmits/receives signals with a plurality of external devices according to the changed second antenna configuration in operation 660. According to an embodiment, at least part of the description made in connection with FIG. 4 may apply likewise to operations 630, 635, 645, 650, 655, and 660 described below in connection with FIG. 6.

Referring to FIG. 7, according to various embodiments of the disclosure, a method 700 for operating an electronic device 101 may include an operation in which the electronic device (e.g., the communication processor 210 of FIG. 2A) receives a signal from each of a plurality of electronic devices according to the first antenna configuration using at least one antenna included in the electronic device in operation 710.

According to various embodiments of the disclosure, the method 700 for operating an electronic device 101 may include an operation in which the electronic device (e.g., the communication processor 210 of FIG. 2A) identifies the received power strength for the received signal in operation 720.

According to various embodiments of the disclosure, the method 700 for operating an electronic device 101 may include an operation in which the electronic device (e.g., the communication processor 210 of FIG. 2A) identifies a ratio of signals with the maximum bandwidth to the signals received from the plurality of external devices when the received power strength is a pre-designated threshold strength or more in operation 730.

According to various embodiments of the disclosure, the method 700 for operating an electronic device 101 may include an operation in which the electronic device (e.g., the communication processor 210 of FIG. 2A) changes the first antenna configuration to the second antenna configuration using the antenna tuning circuit (e.g., the antenna tuning circuit 240 of FIG. 2C) of the electronic device, based at least partially on the identified ratio in operation 740.

Referring to FIG. 8, according to various embodiments of the disclosure, a method 800 for operating an electronic device 101 may include an operation in which the electronic device (e.g., the communication processor 210 of FIG. 2A)

receives a signal from an external device according to the first antenna configuration using the at least one antenna in operation 810.

According to various embodiments of the disclosure, the method 800 for operating an electronic device 101 may include an operation in which when a transmit power strength is detected while receiving the signal from the external device according to the first antenna configuration, the electronic device (e.g., the communication processor 210 of FIG. 2A) identifies whether the detected transmit power strength is a threshold strength or more in operation 820.

According to various embodiments of the disclosure, the method 800 for operating an electronic device 101 may include an operation in which when the detected transmit power strength is the threshold strength or more, the electronic device (e.g., the communication processor 210 of FIG. 2A) identifies whether the signal is signals received from external devices in operation 830.

According to various embodiments of the disclosure, the method 800 for operating an electronic device 101 may include an operation in which when the signal is signals received from the plurality of external devices, the electronic device (e.g., the communication processor 210 of FIG. 2A) identifies the received power strength for each of the plurality of signals received from the plurality of external devices in operation 840.

According to various embodiments of the disclosure, the method 800 for operating an electronic device 101 may include an operation in which the electronic device (e.g., the communication processor 210 of FIG. 2A) identifies a ratio of signals with the maximum bandwidth to the signals received from the plurality of external devices when the identified received power strength is a pre-designated threshold strength or more in operation 850.

According to various embodiments of the disclosure, the method 800 for operating an electronic device 101 may include an operation in which the electronic device (e.g., the communication processor 210 of FIG. 2A) changes the antenna configuration to the second antenna configuration based at least partially on the identified ratio in operation 860.

According to various embodiments of the disclosure, an electronic device (e.g., the electronic device 101 of FIG. 1) may comprise at least one antenna, an antenna tuning circuit, and a processor configured to receive a signal from each of a plurality of external devices according to a first antenna configuration using the at least one antenna, identify a received power strength for the received signals, identify a ratio of a signal with a maximum bandwidth to the signals received from the plurality of external devices when the identified received power strength is a pre-designated threshold strength or more, and change the first antenna configuration to a second antenna configuration using the antenna tuning circuit at least partially based on the identified ratio.

According to various embodiments of the disclosure, the processor may be configured to change to the second antenna configuration when the identified ratio is a pre-designated threshold ratio or more.

According to various embodiments of the disclosure, the second antenna configuration may be configured so that a power loss of the signal with the maximum bandwidth according to the second configuration is smaller than a power loss of the signal having the maximum bandwidth according to the first antenna configuration.

According to various embodiments of the disclosure, the processor may be configured to identify whether a transmit power strength is detected while receiving the signal from each of the plurality of external devices.

According to various embodiments of the disclosure, the processor may be configured to change to the second antenna configuration when the detected transmit power strength is less than a pre-designated threshold strength.

According to various embodiments of the disclosure, the processor may be configured to identify whether the signals are received from the plurality of external devices when the detected transmit power strength is less than a pre-designated threshold strength.

According to various embodiments of the disclosure, the at least one antenna may include a plurality of antennas. The signals may be configured to be received from the plurality of antennas, respectively.

According to various embodiments of the disclosure, the at least one antenna may include one antenna. The signals may be configured to be received through the one antenna.

According to various embodiments of the disclosure, the antenna tuning circuit may include at least one of an impedance tuning circuit and an aperture tuning circuit.

According to various embodiments of the disclosure, a method for controlling an electronic device may comprise receiving a signal from each of a plurality of external devices according to a first antenna configuration using at least one antenna included in the electronic device, identifying a received power strength for the received signal, identifying a ratio of a signal with a maximum bandwidth when the received power strength is a pre-designated threshold strength or more, and changing the first antenna configuration to a second antenna configuration using an antenna tuning circuit of the electronic device at least partially based on the identified ratio.

According to various embodiments of the disclosure, an electronic device comprises at least one antenna, an antenna tuning circuit, and a processor configured to receive a signal from an external device according to a first antenna configuration using the at least one antenna, identify whether a detected transmit power strength is a threshold strength or more when the detected transmit power strength is detected while receiving the signal from the external device according to the first antenna configuration, identify whether the signal is signals received from a plurality of external devices when the detected transmit power strength is the threshold strength or more, identify a received power strength for each of the plurality of signals received from the plurality of external devices when the signal is signals received from the plurality of external devices, identify a ratio of a signal with a maximum bandwidth to the signals received from the plurality of external devices when the identified received power strength is a pre-designated threshold strength or more, and change to a second antenna configuration at least partially based on the identified ratio.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device, comprising:
   at least one antenna;
   an antenna tuning circuit; and
   a processor configured to:
   receive a signal from each of a plurality of external devices according to a first antenna configuration using the at least one antenna;
   identify a received power strength for the received signals;
   identify a ratio of a signal with a maximum bandwidth to the signals received from the plurality of external devices when the identified received power strength is a pre-designated threshold strength or more; and
   change the first antenna configuration to a second antenna configuration using the antenna tuning circuit at least partially based on the identified ratio,
   wherein the second antenna configuration is configured so that a power loss of the signal with the maximum bandwidth according to the second antenna configuration is smaller than a power loss of the signal having the maximum bandwidth according to the first antenna configuration.

2. The electronic device of claim 1, wherein the processor is configured to change to the second antenna configuration when the identified ratio is a pre-designated threshold ratio or more.

3. The electronic device of claim 1, wherein the processor is configured to identify whether a transmit power strength is detected while receiving the signal from each of the plurality of external devices.

4. The electronic device of claim 3, wherein the processor is configured to change to the second antenna configuration when the detected transmit power strength is less than a pre-designated threshold strength.

5. The electronic device of claim 3, wherein the processor is configured to identify whether the signals are received from the plurality of external devices when the detected transmit power strength is less than a pre-designated threshold strength.

6. The electronic device of claim 1,
   wherein the at least one antenna includes a plurality of antennas, and
   wherein the signals are configured to be received from the plurality of antennas, respectively.

7. The electronic device of claim 1,
   wherein the at least one antenna includes one antenna, and wherein the signals are configured to be received through the one antenna.

8. The electronic device of claim 1, wherein the antenna tuning circuit includes at least one of an impedance tuning circuit and an aperture tuning circuit.

9. A method for controlling an electronic device, the method comprising:
receiving a signal from each of a plurality of external devices according to a first antenna configuration using at least one antenna included in the electronic device;
identifying a received power strength for the received signal;
identifying a ratio of a signal with a maximum bandwidth to the signals received from the plurality of external devices when the received power strength is a pre-designated threshold strength or more; and
changing the first antenna configuration to a second antenna configuration using an antenna tuning circuit of the electronic device at least partially based on the identified ratio,
wherein the second antenna configuration is configured so that a loss of the signal with the maximum bandwidth according to the second antenna configuration is smaller than a loss of the signal having the maximum bandwidth according to the first antenna configuration.

10. The method of claim 9, wherein changing to the second antenna configuration includes changing to the second antenna configuration when the identified ratio is a pre-designated threshold ratio or more.

11. The method of claim 9, further comprising identifying whether a transmit power strength is detected while receiving the signal from each of the plurality of external devices,
wherein changing to the second antenna configuration includes changing to the second antenna configuration when the detected transmit power strength is less than a pre-designated threshold strength, and
wherein the method further comprises identifying whether the signals are received from the plurality of external devices before receiving the signal from each of the plurality of external devices according to the first antenna configuration when the detected transmit power strength is less than a pre-designated threshold strength.

12. The method of claim 9,
wherein the electronic device includes a plurality of antennas, and
wherein the signals are configured to be received from the plurality of antennas, respectively.

13. The method of claim 9,
wherein the electronic device includes one antenna, and
wherein the signals are configured to be received through the one antenna.

* * * * *